J. P. DOYLE.
OIL CUP.
APPLICATION FILED FEB. 13, 1909.
954,173.
Patented Apr. 5, 1910.
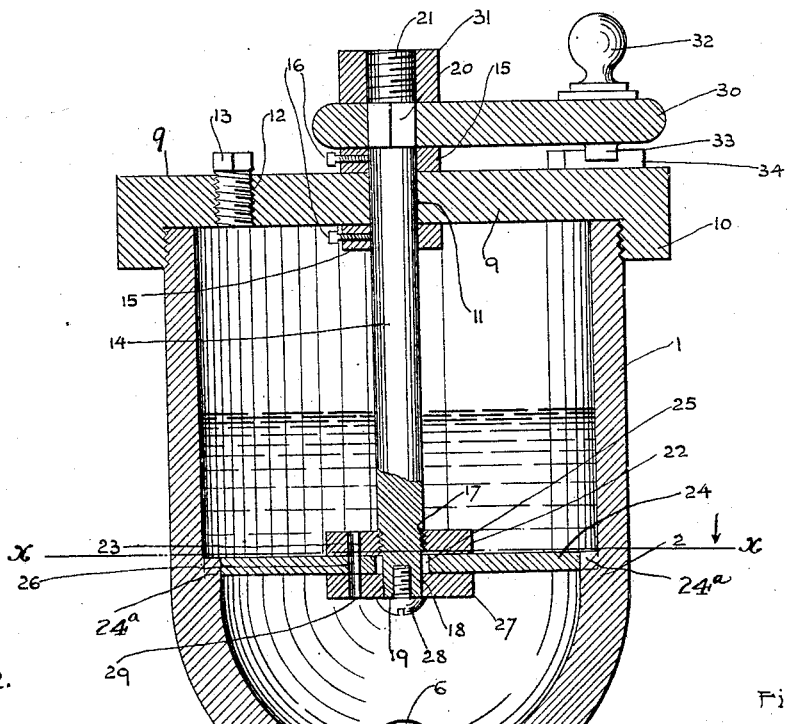
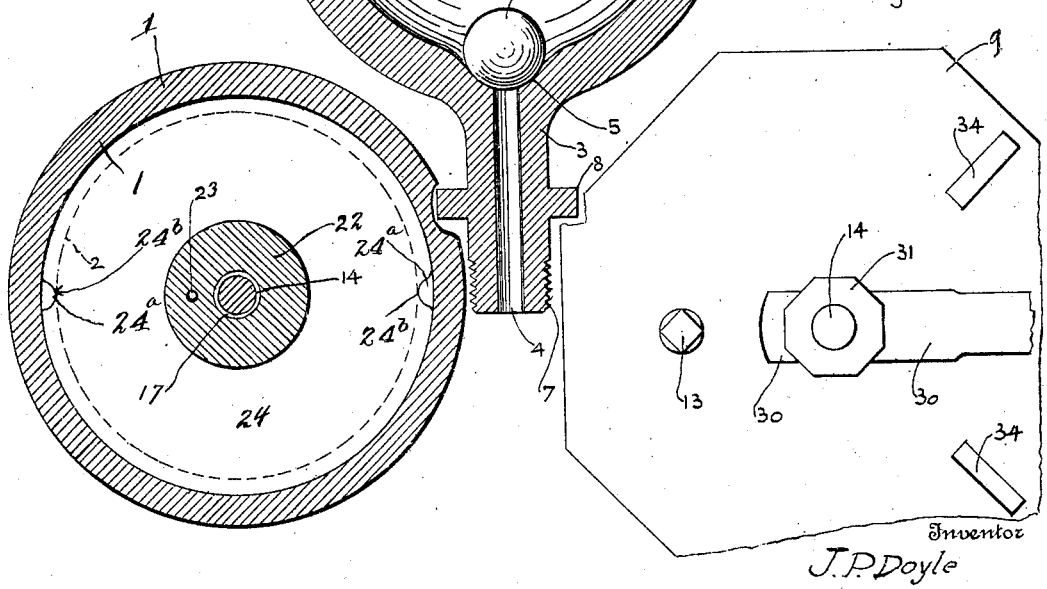
Witnesses
Frank Frimmer
O. H. Butler
Inventor
J. P. Doyle
By H. C. Evert
Attorneys

UNITED STATES PATENT OFFICE.

JAMES P. DOYLE, OF MOUNT PLEASANT, PENNSYLVANIA.

OIL-CUP.

954,173.        Specification of Letters Patent.      Patented Apr. 5, 1910.

Application filed February 13, 1909. Serial No. 477,652.

*To all whom it may concern:*

Be it known that I, JAMES P. DOYLE, a citizen of the United States of America, residing at Mount Pleasant, in the county of Westmoreland and State of Pennsylvania, have invented certain new and useful Improvements in Oil-Cups, of which the following is a specification, reference being had therein to the accompanying drawing.

This invention relates to oil cups, and the invention has for its object to provide a lubricant receptacle that can be advantageously used in connection with the cross-heads, slide valves, driving bars, and movable parts of a locomotive or stationary engine, the oil cup being provided with positive and reliable means for closing the lubricant outlet port when the structure to which it is connected is not in motion.

Another object of the invention is the provision of novel means within the cup for regulating the flow of the lubricant contained therein, and thereby preventing undue waste of the lubricant.

With the above and other objects in view which will more readily appear as the invention is better understood, the same consists in the novel construction combination and arrangement of parts to be presently described and then claimed.

In the drawings, Figure 1 is a vertical sectional view of a lubricant cup constructed in accordance with my invention, Fig. 2 is a horizontal sectional view of the same taken on the line X—X of Fig. 1 looking downward, and Fig. 3 is a plan of a portion of the cup.

In the drawings, the reference numeral 1 designates a cup provided with an interior annular shoulder 2, adjacent to the bottom thereof.

3 designates a central depending stem carried by the bottom of the cup, and having a vertical port 4, communicating with the interior of the cup, the bottom of the cup at the upper end of the port 4 being formed with a seat 5 for a spherical valve 6. The lower end of the stem 3 is exteriorly screw threaded, as at 7, and said stem is provided above the threads 7 with an integral nut 8, whereby the stem may be gripped with a wrench or the like and screwed into a suitable support.

9 designates a cap having a depending and interiorly threaded flange 10 adapted to screw upon the upper end of the cup 1. The cap 9 is provided with a central vertical opening 11 and with an interiorly screw threaded filling-opening 12, the latter permitting of a lubricant being placed in the cup 1, without removing the cap 9. A threaded plug 13 normally closes the filling opening 12.

14 designates a vertical valve rod which is journaled in the opening 11 of the cap 9, and is retained within said opening by collars 15, arranged above and below the cap 9 and fixed to the rod 14, by screws 16. The rod 14 is threaded near its lower end as at 17, and the portion of the rod below said threads is rectangular as at 18, and provided with a threaded socket 19. The rod near its upper end is rectangular as at 20, and above the rectangular portion 20 is threaded as at 21.

22 designates a washer screwed upon the threaded portion 17 of the rod 14, and having a port 23 formed therein.

24 designates a horizontal partition encircling the rectangular portion 18 of the rod 14 and resting upon the shoulder 2 of the cup 1. This partition is provided with a central opening 25 for the rod 14, and with a port 26 adapted to register with the port 23 of the washer 22.

27 designates another washer mounted upon the rectangular portion 18 of the rod 14, below the partition 24 and retained thereon by a screw 28 engaging in the socket 19 of the rod 14. This washer 27 is provided with a port 29 adapted to register with the ports 26 and 23.

The opening 25 in the partition 24 is of sufficient size to permit of the rotation of the squared portion of the stem 14 therein. The partition 24 is held stationary by any suitable means, such as by lugs 24ᵃ on the inner wall of the cup engaging in notches 24ᵇ on opposite sides of the periphery of the partition 24.

30 designates a lever mounted upon the rectangular portion 20 near the upper end of the rod 14, said lever being retained thereon by a nut 31 screwed upon the threaded portion 21 of said rod. The lever 30 is provided near its outer end with a knob 32 and with a depending lug 33 the latter adapted to engage stops 34 located upon the cap 9.

The washers 22 and 27 and the partition 24 are mounted upon the end of the rod 14 before the cap 9 is screwed upon the cup 1. Through the medium of the collars 15 the rod 14 can be adjusted relatively to the cap 9 in order that the horizontal partition 24 can be seated upon the flange 2, and prevent leakage from the upper compartment of the cup to the lower compartment thereof.

The upper compartment of the cup 1 is filled with a lubricant and the lubricant is admitted to the lower compartment of the cup through the ports 23, 26 and 29. With the lever 30 engaging one of the stops 34, all of the ports register. With the lever 30 engaging the other of said stops, the port 29 of the washer 27 and port 23 of the washer are retained out of alinement with the port 26 preventing the contents of the upper compartment of the cup or receptacle from passing into the lower compartment thereof, and with the lever 30 intermediate the stops 34, the ports 23 and 29 partly aline with the port 26 and only allow a small quantity of the lubricant to pass into the lower compartment of the cup. It is therefore apparent that by shifting the lever 30 the flow of the lubricant from the upper compartment of the cup to the lower compartment thereof can be regulated. I employ the two washers 22, 27 in order to form an effectual seal to prevent leakage of liquid from the upper to the lower compartment through the opening 25. With the cup in motion the valve 6 will be rocked in the lower compartment of the cup allowing the lubricant therein to pass through the port 4, but with the cup stationary, the valve 6 closes the port 4, and prevents the lubricant from wasting.

The cap 9 is hexagonal in plan having flat surfaces whereby a wrench can be used for screwing said cap upon the cup 1.

It will be observed that my lubricant cup comprises a receptacle having two compartments formed therein with an adjustable valve for controlling the flow of lubricant from one compartment to the other and a loosely mounted valve controlling the flow of the lubricant from the cup.

The cup in its entirety can be made of strong and durable metal, and of various sizes.

Having now described my invention what I claim as new, is:—

1. A lubricant cup comprising a receptacle, a depending stem carried by the lower end of the receptacle and having a port formed therein, a partition arranged in said receptacle dividing the same into an upper and a lower compartment, said partition provided with a port, a valve loosely mounted in the lower compartment of the cup for normally closing the upper end of the port in said depending stem washers arranged on opposite sides of said partition and each provided with a port, a stem to which said washers are secured, and a lever on the upper end of said stem for actuating the same and thereby the said washers.

2. A lubricant cup comprising a receptacle having a discharge port in the lower end, a loosely mounted valve normally closing said discharge port, a partition mounted within the cup and dividing the latter into an upper and a lower compartment, said partition provided with a port, a cap secured to said cup, a stem mounted for rotation in said cap and extending through said partition and rotatable in the latter, washers secured to the stem on opposite sides of said partition and each having a port, a lever secured to the upper end of said stem for actuating the latter to shift the ports in the washers into and out of registry with the port in said partition, and means carried by the cap for limiting the movement of the lever in both directions.

In testimony whereof I affix my signature in the presence of two witnesses.

JAMES P. DOYLE.

Witnesses:
 GEORGE ECKMAN,
 GEORGE LIPFEL.